United States Patent [19]

Keil et al.

[11] 4,043,984
[45] Aug. 23, 1977

[54] AMINOPLASTS ELASTICIZED WITH BENZOIC ACID ESTERS

[75] Inventors: Karl-Heinz Keil, Offenbach (Main); Karlfried Keller, Bergen-Enkheim; Joachim Ribka, Offenbach (Main)-Buergel; Dieter Tichy, Frankfurt (Main) all of Germany

[73] Assignee: Cassella Farbwerke Mainkur Aktiengesellschaft, Germany

[21] Appl. No.: 610,317

[22] Filed: Sept. 4, 1975

[30] Foreign Application Priority Data

Sept. 12, 1974 Germany .......................... 2443645

[51] Int. Cl.² .................. C08G 12/26; C08G 2/28; C08G 2/30; C08G 14/02
[52] U.S. Cl. ........................ 260/67.6 R; 260/70 A; 260/71; 428/530
[58] Field of Search ................... 260/67.6, 70, 71; 428/530

[56] References Cited

U.S. PATENT DOCUMENTS

| | | | |
|---|---|---|---|
| 3,753,934 | 8/1973 | Diethelm et al. | 260/67.6 R X |
| 3,806,480 | 4/1974 | Leonard | 260/67.6 R X |
| 3,859,243 | 1/1975 | Blasing | 260/67.6 R X |

FOREIGN PATENT DOCUMENTS

| | | |
|---|---|---|
| 1,154,479 | 9/1963 | Germany |
| 1,157,623 | 11/1963 | Germany |

OTHER PUBLICATIONS

J. Am. Chem. Soc. 70, 3370 (1948).

*Primary Examiner*—Murray Tillman
*Assistant Examiner*—T. DeBenedictis, Sr
*Attorney, Agent, or Firm*—Connolly and Hutz

[57] ABSTRACT

Melamine resins are effectively elasticized with an elasticizer having the formula $R-C_6H_4-COO-X-OH$ wherein $C_6H_4$ denotes a phenylene group, R denotes a hydrogen atom or a methyl or ethyl group, and X denotes an unbranched or branched alkylene group with 2 to 6 carbon atoms whose carbon chain is either uninterrupted or interrupted by one oxygen atom. Such elasticized resins are particularly suitable for bonding together laminates.

7 Claims, No Drawings

AMINOPLASTS ELASTICIZED WITH BENZOIC ACID ESTERS

The present invention relates to modified aminoplasts and their use, and is concerned more particularly with modified aminoplasts having high elasticity after curing.

Aminoplasts are resinous products (and solutions thereof) produced by condensation of compounds containing amino groups or imino groups ("aminoplast precursors") with carbonyl compounds with or without alkanols, and which are inert hard infusible and insoluble solids when fully cured. They are widely used, for example, as crosslinking agents in water-soluble and in solvent-soluble lacquer combinations; as cross-linking agents for latices and dispersion binders containing hydroxyl groups; for the manufacture of compression-molding compositions; for use as water-resistant pression-moulding compositions; for use as water-resistant adhesives for gluing of veneers; for the manufacture of other laminates; for the impregnation of paper webs and fabric webs, particularly those used as surface coatings, especially for chipboard sheets; and in the manufacture of joinery edge bands. While urea-aldehyde as well as melamine-formaldehyde resins are so used, non-etherified and alkanol-etherified melamine-formaldehyde resins are also employed in the paper industry for the manufacture of wet-strength and for improving paper coatings, and in the textile industry as finishing agents. For use of the aminoplasts to provide hard surfaces, surface hardness, scratch resistance, dry heat resistance, resistance to water vapor, adhesion and high elasticity of the cured aminoplast resins are the most significant properties.

One of the most important fields of use of the aminoplasts is the manufacture of laminates or the surface-coating of sheet materials, such as for example, chipboard sheets. See in this connection U.S. Pat. application Ser. No. 569,408 filed Apr. 18, 1975. As there is shown, it is known to apply a decorative or protective layer to sheets of wood-based materials (wood fiber boards or chipboard sheets) by laminating decorative paper webs or fabric webs, impregnated with suitable aminoplasts, preferably melamine resins, and having a certain residual moisture content, onto the sheets of the wood-based material by heat-curing. For this process the press pressure can be 10 to 120 kp/cm$^2$* and the temperature can be 120° to 180° C. During the pressing process the aminoplast cures and bonds the paper web or fabric web to the sheet of the wood-base material. Rigid laminates which consist solely of impregnated paper webs or fabric webs and have a decorative or protective surface can be manufactured similarly. These coated wood-based materials and rigid laminates are defined in the N.E.M.A. Standards Publication LDI-1971 (N.E.M.A. National Manufacturer Association) as Laminated Thermosetting Decorative Sheets. They are distinguished by their good chemical and physical properties. The known unmodified aminoplasts hitherto used for impregnating the paper webs of fabric webs intended for the decorative or protective layer, however, only have a low elasticity in the cured state, and surfaces manufactured using these resins tend to form cracks.

*1 kp/cm$^2$ = 1000 pounds per sq. centimeter = 14.22 pounds per. sq. inch.

There has been no lack of attempts to eliminate or reduce the lack of elasticity of the decorative layer by using additives in the impregnating resins. In particular, polyalcohols such as sorbitol, and sugars, as well as aromatic sulphonamides, have been recommended as additives. However with polyalcohols or sugars the water-resistance of the cured resins becomes inadequate if the elasticity is to be adequate. Sulphonamides alone do not suffice to achieve good elasticity.

According to the present invention very effective and desirable elasticizing is accomplished with compounds having the formula

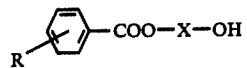
(I)

wherein R denotes a hydrogen atom or a methyl or ethyl group and X denotes a straight-chain or branched alkylene group with 2 to 6 carbon atoms, of which the carbon chain can also be interrupted by an oxygen atom. Cured products so elasticized still have great surface hardness, scratch resistance, dry heat resistance, resistance to water vapor and high adhesion, but they also exhibit particularly high elasticity.

Examples of radicals which may be represented by X are:

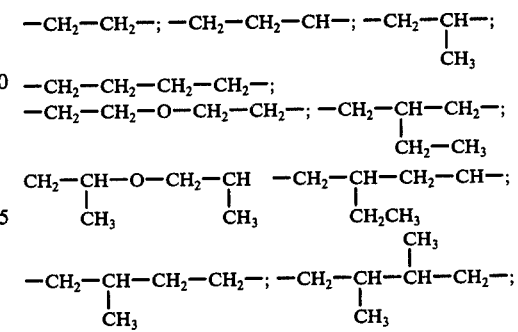

and $-CH_2-O-CH_2-$.

Preferred elasticizers according to the present invention are those in which X denotes a straight-chain or branched alkylene group with 2 to 4 carbon atoms and especially those in which X is an ethylene group. Furthermore particularly advantageous elasticizers are those in which the radical R is in the p-position to the group-COOXOH, and especially those which contain, as modifiers, a compound of the general formula

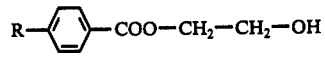

wherein R denotes a hydrogen atom or a methyl or ethyl group.

It is not necessary to employ the elasticizers of the present invention in pure form. Instead it is entirely practical to also employ crude mixtures resulting from esterification of their precursors. These mixtures also contain the diol precursor and its corresponding diester. Such crude esterification mixtures should contain at least 75%, and preferably 95%, of one or more of the foregoing elasticizers.

The amount of the elasticizer added to the aminoplast according to the present invention is the usual proportion, 2 to 20, preferably 8 to 12, percent by weight based on the nonvolatile content of the aminoplast.

Examples of aminoplast precursors which can be used are urea, thiourea, dicyandiamide and guanamines, such as acetoguanamine or benzoguanamine, but especially melamine, while examples of carbonyl compounds which can be used are acetaldehyde and aromatic aldehydes and ketones, but especially formaldehyde. Melamine-formaldehyde condensation products and their co-condensates or mixtures with other aminoplast precursors and formaldehyde, as well as their reaction products with alkanols, have proved particularly suitable for the manufacture of elasticized resins according to the present invention.

The modified aminoplasts according to the present invention are outstandingly suitable for all previously known fields of use and especially where particularly high elasticity of the cured products is of particularly importance. Accordingly, the aminoplasts according to the invention are particularly valuable for the manufacture of laminated thermosetting decorative sheets. This is because it has been found that crack formation in the surface of rigid laminates and wood-based products can be reduced or eliminated, and the elasticity of the surface can be substantially increased, if the paper web or fabric web intended for the decorative layer or protective layer is impregnated with an elasticized aminoplast according to the invention and subsequently laminated onto the sheet of wood-based material in a manner which is in itself known, or converted to a laminate in a manner which is in itself known.

The elasticized aminoplasts according to the invention are obtained by precondensing an aminoplast precursor with a carbonyl compound and optionally with alkalols in a known manner, and then admixing with it 2 to 20 percent by weight, preferably 8 to 12 percent by weight, of the above-disclosed elasticizers relative to the non-volatile content of the aminoplast condensate. In this uncured condition the aminoplast formulations of the present invention are conveniently employed for further processing purposes.

The preparation of the aminoplast is done in a manner known per se by condensation of the said component at elevated temperature as is, for example, described on page 67 et seq. of the monograph "Aminoplastics" by C. P. Vale, Cleaver-Hume-Press, London 1950. Further publications describing the condensation are for instance: Kirk-Othmer: "Encyclopedia of Chemical Technology" Vol. I (1947), pages 756 – 759 and Houben-Weyl: "Methoden der organischen Chemie," Vol. XIV/2 "Makromolekulare Stoffe — part 2" published in 1963 by Georg Thieme Verlag Stuttgart — more particularly pages 346 – 357 (Urea condensation products), pages 357 – 371 (Melamine condensation products), pages 382 – 388 (Condensation products of Dicyandiamide and Guanadine), and the monograph of John F. Blais "Amino Resins" issued by Reinhold Publishing Corpor. New York 1959. The condensation conditions are further illustrated by the Working Examples mentioned hereinafter.

The condensation is effected in a neutral to alkaline pH-range preferably at a pH 8 to 9.5 and at elevated temperature and particularly at a temperature range from between 70° and 100° C until resins are formed. For the purpose of determining the end point of the condensation one may rely upon the dilutability of the resin solution with water. In order to characterize the resins reference may further be made to the gel time in a resin solution having a temperature of 100° C.

Through the determination of the water-dilutability it is found how many parts by volume of water can be absorbed at 20° C by one part by volume of the resin solution without any amount of resin being deposited. To realize this procedure the resin is titrated with water. The proportion of "water-dilutability 1 : x" as given implies that one ml resin solution is capable of absorbing x ml of water at 20° C, without any turbidity occuring.

It is also possible to add salts of weak to strong acids, for example diethanolamine acetate, ethanolamine hydrochloride, ethylenediamine acetate, ammonium thiocyanate, ammonium lactate or ethylenediamine phosphate to the aminoplast composition according to the present invention in order to accelerate the curing without the elasticity of the coatings deteriorating as a result. Small amounts of other modifiers, such as for example monoalcohol or dialcohols, sugars, salts of amidosulphonic acid, aromatic sulphonic acid amides and the like can also be added when manufacturing the resins.

As a rule the condensation to make the uncured resin is continued until the condensate can be diluted with about 1 to 2 volumes of water at 20° C without phase separation. In some cases for example, if substantial amounts of salts of amidosulphonic acid are added at this stage, the condensates suitable for further processing purposes become soluble in water in all proportions.

The elasticizers of the present invention are obtained by known processes.

Thus it is possible, according to J. Am. Chem. Soc. 70, 3370 (1948), to react diols having 2 to 6 carbon atoms, of which the carbon chain can also be interrupted by an O atom, with carboxylic acids of the formula II:

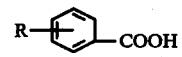

(II)

wherein R has the above-mentioned meaning, in the molar ratio of 1:1. This reaction can be carried out with an excess of the diol to minimize the formation of diesters, and optionally in the presence of catalytic amounts of fairly strong organic or inorganic acids, such as, for example, p-toluenesulphonic acid or sulphuric acid.

It is also possible to manufacture the elasticizers according to the technique disclosed in J. prakt. Chem. 312, 600 (1970), by trans-esterification of lower alkyl esters of the formula

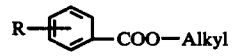

with the appropriate diols, suitably with addition of known trans-esterification catalysts, such as for example p-toluene-sulphonic acid, zinc acetate or manganese acetate.

It is also practical to react the carboxylic acids of the formula II in solution in dimethylformamide, with ethylene oxide in the presence of alkali metal salts of inorganic acids, such as for example NaCl, $Na_2SO_4$ and others, analogously to the disclosure of German Patent Specifications Nos. 1,154,479 (published Sept. 19, 1963) and 1,157,623 (published Nov. 21, 1963). The resulting esters can be converted into compounds of the formula

by using an excess of ethylene oxide in such reaction.

The manufacture of decorative coated sheets of wood-based materials using the aminoplasts according to the present invention is carried out by impregnating the paper webs or fabric webs with an aminoplast composition according to the present invention and pressing them, in a manner which is in itself known, onto a previously prepared sheet of wood-based material under pressures of 16 to 25 kp/cm² and temperatures of 120° to 160° C.

Decorative laminates are manufactured by impregnating paper webs or fabric webs with an aminoplast composition of the present invention and drying them to a certain residual moisture content, generally 4 to 10% by weight, at temperatures of 110° to 160° C. These impregnated paper or fabric webs, together with several layers or kraft papers impregnated with phenolic resins, are pressed under elevated pressure and temperature to form the laminate. The pressing temperatures are about 120° to 160° C. and the pressing pressure is 80 to 120 kp/cm²; the pressing time depends on the thickness and amount of the laminates produced per heating platen and can be 10 to 80 minutes. Before being released from the press, the material is preferably cooled down to about 60° to 70° C.

The thermosetting decorative sheets thus manufactured are distinguished, for example, in that the surfaces are unobjectionably cured and notwithstanding have a high gloss, a great elasticity and a high resistance to water and steam. They, therefore, meet high standards in the testing according to the Kiton-Test (to determine the curing criterion, the Kiton-Test is described in the examples referred to hereinafter) and in the testing of their behavior towards the susceptivity to cracking (in accordance with DIN 53 799, figure 4.7., or DIN* 16 926). Thus they do not show any cracks, e.g., when testing the susceptivity to cracks in accordance with DIN 53 799, figure 4.7, in many instances they do not, even if the test conditions in comparison with the DIN-Standards are tightened by storing the test specimen at a temperature higher than that as prescribed. In contrast thereto, cracks do occur if a corresponding aminoplast without the elasticizers of the present invention is used for the impregnation.
*DIN = Deutsche Industrie Normen (German Industrial Standards)

The percentage data given in the following examples denote percentages by weight.

EXAMPLE 1 a. 200 g of melamine, 320 g of 30% strength aqueous formaldehyde solution and 30 g of methanol are adjusted to pH 8.4–9.2 by adding 2 N sodium hydroxide solution and condensed at 90° C. while continuously checking the pH value and adjusting it to keep within the specified range, until the product had a water-dilutability of 1:1.5 at 20° C. After cooling the undiluted solution to room temperature, 30 g of benzoic acid β-hydroxyethyl ester and 5.2 ml of a 50% strength aqueous solution of diethanolamino acetate are dissolved in the resulting resin solution.

b. A white decorative paper weighing 90 g/m² is impregnated in solution (a) and dried at 130° C to a resin content of 58 to 60% and a volatile content of 5.5 to 6.0%. The volatile content was determined by weighing a specimen prior to and subsequent to a 5-minute drying at a temperature of 160° C.

This paper is laid on a sheet of chipboard (density 700 kg/m³) and is pressed between heated high gloss chromium-plated steel pressure platens under the following conditions:

| | |
|---|---|
| Pressing time: | 8 minutes |
| Pressing temperature: | 140° C (temperature of the heated platens) |
| Pressing pressure: | 20 kp/cm² |
| Cooling: | down to about 70° C. |

After release from the press, a perfectly continuous surface is obtained. The degree of curing according to the Kiton test corresponds to stage 2 to 3.

The Kiton test was carried out as follows: Under a watch-glass with a 3 cm diameter, one milliliter of the following solution:

| | | |
|---|---|---|
| 1 | l | water |
| 20 | ml | concentrated sulfuric acid |
| 20 | ml | 2% aqueous solution of Kiton pure red 2 BL (C.I.) Acid Red 45) | was allowed to act on the test surface for 2 hours. Thereafter the degree of the coloration was compared with a six-stage scale, stage 1 having no coloration
stage 6 having a strong coloration.

Stage 1 is considered an optimum hardening and stage 6 an insufficient hardening.

The surface did not show any cracks when tested with regard to the susceptivity to cracking in accordance with DIN 16 926 or DIN 53 799, item 4.7.1, the storage of the specimen being effected at 70° C for 20 hours. Even after a storage of the specimen under more severe conditions, for 20 hours at 80° C, no crack formation was observable. The same results were obtained by preparing the aminoplast solution of paragraph (a) with 2N sodium carbonate solution instead of 2N sodium hydroxide solution and at a condensation temperature of 80° C instead of 90° C, the other conditions in paragraph (a) and (b) remaining unchanged.

EXAMPLE 2

Example 1 was repeated but without addition of the benzoic acid β-hydroxyethyl ester. After release from the press a continuous surface was found, and the material conformed to stage 2 of the Kiton test. However, surface cracks were observed after testing with regard to the susceptivity to cracking.

EXAMPLE 3 a. 176 g of melamine, 268 g of 39% strength aqueous formaldehyde solution and 55 g of water are brought to pH 8.4–9.2 with 2 N sodium hydroxide solution and condensed at 90° C while continuously checking the pH value, until the product had a water dilutability of 1:1.0 at 20° C. After cooling, 22.5 g of 1,2-propanediol monobenzoate and 4.2 g of a 50% strength solution of diethanolamine acetate are added to the resin solution.

b. A decorative paper weighing about 120 g/m² is impregnated in the foregoing resin formulation and dried at 130° C to a resin content of 55 to 57% and a volatile content of 5.0 to 5.5%.

The resulting paper was pressed onto a sheet of chipboard between hard-chromium-plated nickel platens heated to 145° C, using a pressure of 20 kp/cm² and a pressing time of 10 minutes. Before release from the press the material is cooled down to a temperature of about 70° C. The surface of the coated chipboard is free from pores and very glossy. The Kiton test corresponds to stage 2. After testing the susceptivity to cracking no cracks were found on the coated sheet. The same results were obtained by preparing the aminoplast solution of paragraph (a) at a condensation temperature of 101° C with refluxing, the other conditions in paragraphs (a) and (b) remaining unchanged.

EXAMPLE 4 a. 226 g of melamine, 305 g of 39% strength aqueous formaldehyde solution and 20 g of sodium amidosulphonate are brought to pH 8.4–9.2 by adding 2 N sodium hydroxide solution and condensed at 90° C while checking the pH value, until the product had a water dilutability of 1:1.5 at 20° C. After cooling the resin solution, 120 g of water and 36.5 g of 1,3-butanediol monobenzoate are added.

b. A decorative paper weighing 100 g/m² is impregnated in this resin formulation and is dried at 130° C to a resin content of 58 to 60% and volatile content of 5.0 to 5.5%. The paper was pressed onto a sheet of chipboard of thickness 16 mm and density about 700 kg/m³ between hard-chromium-plated nickel platens under the following conditions:

| Pressing time: | 10 minutes |
|---|---|
| Pressing temperature: | 140° C (platen temperature) |
| Pressing pressure: | 18 kp/cm². |

After cooling down to about 70° C the sheet was released from the press. The surface was very glossy and free from pores. The Kiton test corresponded to stage 3. After testing the susceptivity to cracking no cracks were found on the surface. The same results were obtained by preparing the aminoplast solution of paragraph (a) with 2 N sodium carbonate solution instead of 2 N sodium hydroxide solution and at a condensation temperature of 95° C instead of 90° C, the other conditions under paragraphs (a) and (b) remaining unchanged.

EXAMPLE 5

Example 4 was repeated but without the addition of the 1,3-butanediol monobenzoate. The coated sheet of chipboard obtained shows a continuous surface and a curing stage of 3. However, after the heat test cracks were found in the surface.

EXAMPLE 6 a. 126 g of melamine, 200 g of 30% strength aqueous formaldehyde solution and 36 g of methanol were brought to pH 8.4–9.2 with 2 N sodium hydroxide solution and condensed at 90° C while continuously checking the pH value, until the product had a water dilutability of 1:1.2 at 20° C. After cooling, 9.3 g of benzoic acid β-hydroxyethyl ester and 0.75 g of a 50% strength aqueous solution of ethanolamine hydrochloride were added to the resin solution.

b. A decorative paper weighing about 80 g/m² was impregnated in the resulting resin formulation and dried at 130° C to a resin content of 50%, and a volatile content of 6.5%. The paper was pressed onto a sheet of chipboard between hard-chromium plated platens polished to a satin finish in a single-stack press and heated to 145° C.

| Pressing time: | 75 seconds |
|---|---|
| Pressing pressure: | 22 kp/cm². |

The sheet was released from the press without having been cooled down. The surface was pore-free and continuous. The curing stage corresponds to stage 2. After testing the susceptivity to cracking no crack formation was detectable on the surface. Same results were obtained by preparing the aminoplast solution of paragraph (a) at a pH of 9.2–10.0, the other conditions of paragraphs (a) and (b) remaining unchanged.

EXAMPLE 7 a. 252 g of melamine, 308 g of 39% strength aqueous formaldehyde solution, 65 g of water and 65 g of methanol were brought to pH 8.4–9.2 with 2 N sodium hydroxide solution and condensed at 90° C while continuously checking the pH value, until the product had a water dilutability of 1:1.5 to 1:2.

After cooling, 22 g of 1,3-butanediol monobenzoate, 22 g of 1,2-propanediol monobenzoate and 6.6 g of diethanolamine acetate were added to the resin solution.

b. A decorative paper weighing 110g/m² was impregnated in the resin formulation and dried at 130° C to a resin content of 56 to 58% and a volatile content of 4.5 to 5.0%. The paper was pressed onto a sheet of chipboard of thickness 14 mm and density 700 kg/m³ between hardchromium-plated nickel platens heated to 150° C, using 20 kp/cm² pressing pressure and 6 minutes pressing time. After cooling down to about 70° C, the sheet was released from the press. The surface was pore-free and very glossy. The Kiton test corresponded to stage 2 to 3. After testing the susceptivity to cracking no cracks were found on the surface.

EXAMPLE 8

Example 7 was repeated but without the 1,3-butanediol monobenzoate and without the 1,2-propanediol monobenzoate, and a sheet of chipboard was coated therewith.

While the continuity and curing of the surface was the same as for Example 7, the formation of cracks on the surface was found after testing the susceptivity to cracking.

EXAMPLE 9 a. 262 g of melamine, 320 g of 39% strength aqueous formaldehyde solution, 22 g of sorbitol (70% strength), 12.5 g of sodium amidosulphonate, 16.6 of sugar and 196 g of water were brought to pH 8.2 to 9.4 with 2 N sodium hydroxide solution and condensed at 80° C while continuously checking the pH value, until the product had a water dilutability of 1:2 at 20° C.

After cooling, 34 g of 1,2-propanediol monobenzoate and 4.3 g of 50% strength aqueous solution of diethanolamine acetate were added to the resin solution.

b. A decorative paper weighing about 120 g/m² was impregnated in this resin formulation and dried at 130° C resin to a content of 56 to 58% and a volatile content of 5.5 to 6.0 at 130° C.

The decorative paper was laminated between hard-chromium plated high-gloss nickel platens under the following pressing conditions:

| | |
|---|---|
| Pressing temperature: | 155° C heating platen temperature |
| Pressing time: | 6 minutes |
| Pressing pressure: | 20 kp/cm² |

After cooling down to about 70° C, the sheet was released from the press. The surface was very glossy and free from pores. The Kiton test corresponded to stage 2 and 3. After testing the susceptivity to cracking test, no cracks were found on the surface.

EXAMPLE 10

The benzoic acid β-hydroxyethyl ester employed as the modifier in Example 1 can be prepared as follows:

170.6 g (3.7 mols) of ethylene glycol and 0.34 g of manganese acetate hexahydrate were heated to 140° C and 170 g (1.25 mols) of benzoic acid methyl ester were then added dropwise over the course of 3 hours at 140° to 160° C, after which the mixture was stirred for a further 30 minutes at 160° C. Thereafter, at the same temperature, 85.3 g (1.85 mols) of ethylene glycol and 170 g (1.25 mols) of benzoic acid methyl ester were also added dropwise over the course of 3 hours.

521.5 g of a reaction product containing, according to gas chromatography, 58.8% of benzoic acid β-hydroxyethyl ester were obtained.

After distilling off the excess glycol and benzoic acid methyl ester and subsequent fractional distillation, 137 g of a fraction of boiling range 117° to 126° C at 0.2 mm Hg were obtained, containing 6% of glycol, 4% of ethylene glycol dibenzoate and 90% of benzoic acid β-hydroxyethyl ester; this material was employed as the modifier in Example 1.

If, using an analogous method, (a) 1,2-propanediol is reacted with benzoic acid methyl ester, (b) 1,3-propanediol is reacted with benzoic acid methyl ester, (c) 1,3-butanediol is reacted with benzoic acid methyl ester, (d) 2,3-butanediol is reacted with benzoic acid methyl ester or (e) 1,4-butanediol is reacted with bezoic acid methyl ester, the following are obtained: (a) benzoic acid 1,2-propanediol monoester of boiling point $_{0.8}$ 110° to 115° C, (b) benzoic acid 1,3-propanediol monoester of boiling point $_{0.1}$ 105° to 109° C, (c) benzoic acid 1,3-butanediol monoester of boiling point $_{0.6}$ 115° to 120° C, (d) benzoic acid 2,3-butanediol monoester of boiling point $_{0.2}$ 96° to 102° C or (e) benzoic acid 1,4-butanediol monoester of boiling point $_{0.5}$ 132° to 136° C.

EXAMPLE 11 a. 315 g of melamine, 384 g of 39% strength aqueous formaldehyde solution and 150 g of water were brought to pH 8.4–9.2 by adding 2 N sodium hydroxide solution and were condensed at 90° C while continuously checking this pH value, until the product had a water dilutability of 1 : 2 at 20° C. After cooling, 28 g of benzoic acid β-hydroxyethyl ester and 4 ml of a 50% strength aqueous solution of diethanolamine acetate were added to the resin solution.

b. A white decorative paper weighing 120 g/m² was impregnated in the resulting resin formulation and dried at 130° C to a resin content of 48% and a volatile content of 6.5%. In the same way an overlay paper of raw weight 30 g/m² was impregnated and dried at 130° C to a resin content of 70% and to a volatile content of 6.5%.

Core papers were prepared from paper webs impregnated with phenol-formaldehyde resin (Bakelite 514) to a resin content of 35% and dried to 5% residual moisture.

The papers mentioned were pressed in the following arrangement, to give a laninate:
  1 asbestos press pad
  1 mat chromium-plated nickel platen
  1 overlay paper
  1 decorative paper
  9 core papers
  2 siliconized release papers
  9 core papers
  1 decorative paper
  1 overlay paper
  1 platen as above
  1 asbestos press pad
  1 carrier sheet This arrangement was pressed at 140° C under a pressure of 100 kp/cm² for 10 minutes. After cooling down to 60°–70° C, the dual sheet assembly was released from the press. Laminates having perfectly continuous surfaces were obtained. The degree of curing corresponded to stage 1-2 of the Kiton scale.

In this instance the Kiton test is performed by immersing half of the material on test in a boiling solution of the following composition:
  1 l. water
  5 ml. conc. sulfuric acid
  1 ml. of 2% aqueous solution of Kotonechtrot 2 BL (see C.I. Acid Red 45) for 10 minutes.

Thereafter the grade of coloring is compared with that shown on a six-graded scale according to which
  grade 1 indicates no coloring
  grade 6 indicates considerable coloring.

The surface did not show any cracks when tested with regard to the susceptivity to cracking in accordance with DIN 53 799, item 4.7.2., the storage of the specimen carried out for 20 hours at 80° C.

EXAMPLE 12

200 g of a commercial urea resin named $^R$ Kaurit 320 of BADISCHE ANILIN- UND SODA-FABRIK AG, Ludwigshafen/R$_h$ein of the following properties

| | |
|---|---|
| content: | appr. 68% |
| viscosity: | 240 sec. measured at 20° C. in a DIN cup having a 4 mm orifice according to DIN 53 211. |
| pH-value: | 8.7 |
| gel time at 100° C: | 125 minutes | are admixed with 72 g water, 10 g benzoic acid-β-hydroxyethyl ester and 0.68 g ethanolamino-hydrochloride.

An overlay paper weighing about 30 g/m² and consisting of α-cellulose, and a decorative paper weighing 120 g/m² were impregnated in this resin formulation and subsequently dried.

| | |
|---|---|
| Resin content of overlay paper: | 71% |
| Residual moisture content: | 6.2% |
| Resin content of the decorative paper: | 48% |
| Residual moisture content: | 4% |

The papers mentioned were pressed in the following arrangement to give a laminate using core papers impregnated in phenol resin:
  1 heating platen
  1 asbestos press pad of 1200 g/m²

1 high-polish platen
1 overlay paper
1 decorative paper
6 core papers
2 separating sheets
6 core papers
1 overlay paper
1 press platen
1 asbestos press pad of 80 g/m²
1 carrier sheet
under the following pressing conditions:

| Pressing temperature: | 145° C |
| Pressing time: | 15 minutes |
| Pressing pressure: | 100 kp/cm². |

After the recooling to roughly 80° C, a laminate was obtained, the degree of curing corresponding to stage 2 according to the Kiton test. After the test of the tendency to cracking in accordance with DIN 53 799, item 4.7.2., in which case the specimens were stored at 80° C for 20 hours, the laminate showed no crack formation.

EXAMPLE 13

A resin solution as prepared according to Working Example 12 was processed into a laminate as depicted in Example 12, however, without adding benzoic acid-β-hydroxyethyl-ester. The test of the tendency to cracking in accordance with DIN 53 799, item 4.7.2., produced a micro crack formation on the laminate prepared. The Kiton test resulted in a degree of curing corresponding to stage 3 of the Kiton test scale.

EXAMPLE 14

126 g melamine
154 g formaldehyde of 39% strength in water
50 g methanol
2 ml 2 N sodium hydroxide solution were condensed at 85° C to give a water dilutability of 1 : 2.0 at 20° C, whilst continuously controlling the pH-value to between 8 and 9.

The resin formulation so obtained was thinned with water to give a concentration of 52% and subsequently admixed with 12 g benzoic acid-β-hydroxyethyl ester of 100% strength. Thereafter an overlay paper weighing 30 g/m² and a printed decorative paper weighing 100 g/m² were impregnated in this solution and dried at 130° to 140° C. After drying, the resin portions related to the final weight of the paper and the residual moisture content (determined after five minutes drying at 160° C):

Overlay paper: resin content 70%, residual moisture content: 6.5%
decorative paper: resin content 46%, residual moisture content: 5.5%

The papers mentioned were pressed in the following arrangement together with the core papers impregnated in phenol resins between hard-chromium plated high-gloss steel platens at a temperature of 140° C, a pressure of 100 kp/cm² and pressing time of 10 minutes to give a laminate as follows:

1 asbestos press pad of about 2000 g/m²
1 press platen
1 overlay paper
1 decorative paper
8 core papers impregnated in phenol resin having a resin content of 35% and a residual moisture content of 5.5%
the last paper having a residual moisture content of 7%
2 separating sheets
8 core papers impregnated in phenol resin, as indicated above
1 decorative paper
1 overlay paper
1 press platen
1 asbestos press pad of 1200 g/m²
1 carrier sheet After cooling down to about 70° C, the sheet was released from the press. Obtained was a laminate the surface of which fully met the standards of DIN 16 926 (German Industrial Standards).

After the test of the tendency to cracking in accordance with DIN 53 799, item 4.7.2. in which case the specimens were stored at 80° C for 20 hours, no crack formation was detectable on the surface. The degree of curing corresponded to stages 1 to 2 of the six-graded Kiton test Scale.

EXAMPLE 15

Example 14 was repeated but without addition of the benzoic acid-β-hydroxyethyl ester to obtain a melamine resin which was worked into a laminate as indicated in Example 14.

After the test of the tendency to cracking in accordance with DIN 53 799, item 4.7.2. in which case the specimens were stored at 80° C for 20 hours, micro cracks and cracks of up to 2 mm length were detectable. The degree of curing corresponded to stages 1 to 2 of the Kiton test Scale.

Obviously many modifications and variations of the present invention are possible in the light of the above teachings. It is, therefore, to be understood that within the scope of the appended claims the invention may be practiced otherwise than as specifically described.

What is claimed:

1. In the combination of an aminoplast resin with an elasticizing agent to improve the elasticity of the cured resin, the improvement according to which the elasticizing agent has the formula $$R-C_6H_4-COO-X-OH$$

wherein $C_6H_4$ denotes a phenylene group, R denotes a hydrogen atom or a methyl or ethyl group, and X denotes an unbranched or branched alkylene group with 2 to 6 carbon atoms whose carbon chain is either uninterrupted or interrupted by one oxygen atom.

2. The combination of claim 1, wherein X denotes an unbranched or branched alkylene group with 2 to 4 carbon atoms.

3. The combination of claim 1, wherein X denotes an ethylene group.

4. The combination of claim 1, wherein R is in the para position with respect to the —COOXOH group.

5. The combination of claim 3, wherein R is in the para position with respect to the -COOXOH group.

6. The combination of claim 1, wherein the elasticizing agent is a crude esterification product at least 75% of which has the specified formula.

7. The combination of claim 1, wherein the proportion of the elasticizing agent is 8 to 12 per cent by weight of the non-volatile content of the resin.

* * * * *